US011861508B2

(12) United States Patent
Liu

(10) Patent No.: US 11,861,508 B2
(45) Date of Patent: Jan. 2, 2024

(54) CAUSAL ANALYSIS

(71) Applicant: NEC CORPORATION, Tokyo (JP)

(72) Inventor: Chunchen Liu, Beijing (CN)

(73) Assignee: NEC CORPORATION, Tokyo (JP)

(*) Notice: Subject to any disclaimer, the term of this patent is extended or adjusted under 35 U.S.C. 154(b) by 756 days.

(21) Appl. No.: 16/965,066

(22) PCT Filed: Jun. 6, 2019

(86) PCT No.: PCT/CN2019/090413
§ 371 (c)(1),
(2) Date: Jul. 27, 2020

(87) PCT Pub. No.: WO2020/243965
PCT Pub. Date: Dec. 10, 2020

(65) Prior Publication Data
US 2023/0153636 A1    May 18, 2023

(51) Int. Cl.
*G06N 5/022* (2023.01)
(52) U.S. Cl.
CPC .................................. *G06N 5/022* (2013.01)
(58) Field of Classification Search
None
See application file for complete search history.

(56) References Cited

U.S. PATENT DOCUMENTS

| 5,581,459 A * | 12/1996 | Enbutsu ................. G06N 3/042 |
| | | 700/32 |
| 2010/0332439 A1* | 12/2010 | Adachi .................. G06Q 30/02 |
| | | 706/52 |

(Continued)

FOREIGN PATENT DOCUMENTS

| CN | 107111603 A | 8/2017 |
| CN | 108398935 A | 8/2018 |

(Continued)

OTHER PUBLICATIONS

Title—Decision Support System for Cost-Benefit Analysis in Service Provision Authors—Emadoddin Livani, Elham Paikari, Günther Ruhe Publisher—Research Gate Date—2011 (Year: 2011).*

(Continued)

*Primary Examiner* — Tsu-Chang Lee
(74) *Attorney, Agent, or Firm* — Sughrue Mion, PLLC

(57) ABSTRACT

Embodiments of the present disclosure relate to methods, systems and computer program products for causal analysis. In some embodiments, there is provided a computer-implemented method. The method comprises determining, from observation samples of a plurality of factors, a first causal structure indicating a first causal relationship among the plurality of factors, each observation sample including a set of observation values of the plurality of factors; presenting the first causal structure to a user; in response to receiving at least one user input about the first causal structure from the user, executing actions associated with the at least one user input based on the first causal structure; and presenting a result of the execution of the actions to the user. In other embodiments, another method, systems and computer program products are provided.

20 Claims, 11 Drawing Sheets

(56) References Cited

U.S. PATENT DOCUMENTS

| | | | |
|---|---|---|---|
| 2016/0171383 A1* | 6/2016 | Narain | G06N 7/01 706/52 |
| 2017/0220937 A1 | 8/2017 | Wada et al. | |
| 2019/0102680 A1 | 4/2019 | Liu et al. | |
| 2020/0193314 A1* | 6/2020 | Kojima | G06N 5/046 |

FOREIGN PATENT DOCUMENTS

| | | | |
|---|---|---|---|
| CN | 109791569 A | 5/2019 |
| JP | 2015-153133 A | 8/2015 |
| JP | 2017-537365 A | 12/2017 |
| JP | 2018-128855 A | 8/2018 |
| JP | 2018-181158 A | 11/2018 |

OTHER PUBLICATIONS

Title—Excel What-if Analysis: GoalSeek Author—Tepring Crocker Publisher—Fred Pryor Seminars Date—Mar. 17, 2016 (Year: 2016).*
Title—What is Goal Seek Author—Deepanshu Bhalla Publisher—Listen Data Date—2017 (Year: 2017).*
Written Opinion for PCT/CN2019/090413, dated Mar. 4, 2020.
International Search Report for PCT/CN2019/090413, dated Mar. 4, 2020.
Office Action dated May 16, 2023 in Japanese Application No. 2021-505729.

* cited by examiner

CAUSAL ANALYSIS

TECHNICAL FIELD

Embodiments of the present disclosure generally relate to the field of machine learning, and in particular, to methods, systems and computer program products for causal analysis.

BACKGROUND

Discovering why and how a thing happened and finding a strategy which enables a desirable thing to happen become urgent requirements in many fields, such as, marketing research, manufacture, healthcare, retail and so on. Therefore, it would be desirable to provide a causal analysis system which can not only provide insights to show why and how a thing happened but also predict an effect of a strategy if it is carried out or recommend an optimal strategy which enables a desirable thing to happen.

SUMMARY

In general, example embodiments of the present disclosure provide methods, systems and computer program products for causal analysis.

In a first aspect, there is provided a computer-implemented method. The method comprises determining, from observation samples of a plurality of factors, a first causal structure indicating a first causal relationship among the plurality of factors, each observation sample including a set of observation values of the plurality of factors; presenting the first causal structure to a user; in response to receiving at least one user input about the first causal structure from the user, executing actions associated with the at least one user input based on the first causal structure; and presenting a result of the execution of the actions to the user.

In a second aspect, there is provided a computer-implemented method. The method comprises obtaining observation samples of a plurality of factors and a causal structure indicating a causal relationship among the plurality of factors, each observation sample including a set of observation values of the plurality of factors; in response to a target factor being identified in the plurality of factors, determining, from the plurality of factors, at least one factor affecting the target factor based on the causal structure; estimating, for each of the at least one factor, an overall causal effect of the factor on the target factor based on the observation samples and the causal structure; and ranking the at least one factor based on respective overall causal effects of the at least one factor on the target factor.

In a third aspect, there is provided a system. The system comprises a processing unit and a memory coupled to the processing unit. The memory stores instructions that, when executed by the processing unit, perform actions comprising: determining, from observation samples of a plurality of factors, a first causal structure indicating a first causal relationship among the plurality of factors, each observation sample including a set of observation values of the plurality of factors; presenting the first causal structure to a user; in response to receiving at least one user input about the first causal structure from the user, executing actions associated with the at least one user input based on the first causal structure; and presenting a result of the execution of the actions to the user.

In a fourth aspect, there is provided a system. The system comprises a processing unit and a memory coupled to the processing unit. The memory stores instructions that, when executed by the processing unit, perform actions comprising: obtaining observation samples of a plurality of factors and a causal structure indicating a causal relationship among the plurality of factors, each observation sample including a set of observation values of the plurality of factors; in response to a target factor being identified in the plurality of factors, determining, from the plurality of factors, at least one factor affecting the target factor based on the causal structure; estimating, for each of the at least one factor, an overall causal effect of the factor on the target factor based on the observation samples and the causal structure; and ranking the at least one factor based on respective overall causal effects of the at least one factor on the target factor.

In a fifth aspect, there is provided a computer program product. The computer program product is tangibly stored on a machine-readable medium and comprises machine-executable instructions. The machine-executable instructions, when executed on a device, cause the device to perform the method according to the first aspect of the present disclosure.

In a sixth aspect, there is provided a computer program product. The computer program product is tangibly stored on a machine-readable medium and comprises machine-executable instructions. The machine-executable instructions, when executed on a device, cause the device to perform the method according to the second aspect of the present disclosure.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1A:
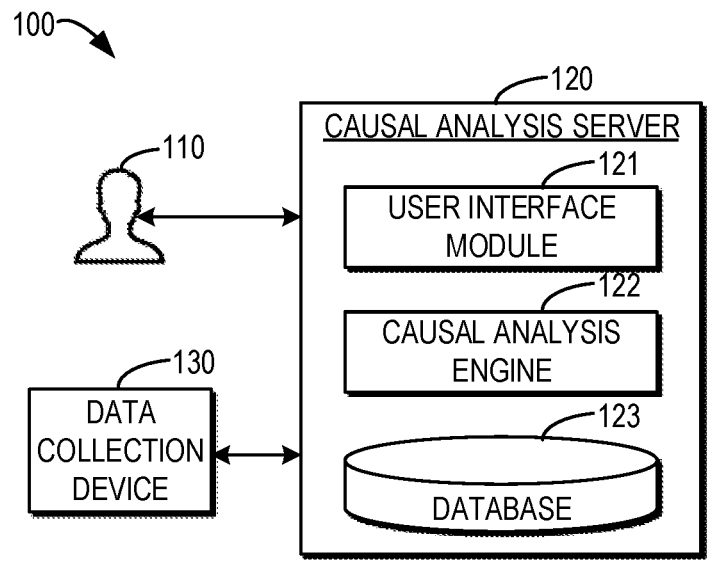
FIG. 1A illustrates an example environment in which embodiments of the present invention can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As described above, discovering why and how a thing happened and finding a strategy which enables a desirable thing to happen become urgent requirements in many fields, such as, market research, manufacture, healthcare, retail and so on. For example, in the field of marketing research, people want to know what factors affect customer satisfaction with a telecommunication operator and how to improve the customer satisfaction. In the field of product manufacture, people want to know what factors affect product yields and how to improve the product yields. In the field of retail, people want to know what factors affect product sales and how to improve the product sales. In the field of software development, people want to know what factors affect software failure rate and how to reduce the software failure rate. Therefore, it would be desirable to provide a causal analysis system which can discover a causal relationship among a plurality of factors and recommend a strategy to affect a target factor in the plurality of factors based on the causal relationship.

Some conventional solutions support causal analysis in a manual way and require a lot of manual interactions to perform the causal analysis, which results in low efficiency and cannot satisfy the above needs in different fields.

Embodiments of the present disclosure provide a solution for causal analysis, so as to solve the above problems and/or one or more of other potential problems. In this solution, a causal relationship among a plurality of factors can be automatically discovered from observation samples of the plurality of factors. A causal structure representing the causal relationship can be presented to a user. The user can adjust the causal structure to input some prior knowledge, so as to optimize the discovered causal structure. The user can specify a target factor in the plurality of factors and retrieve one or more key factors that have greatest effects on the target factor from the plurality of factors. Moreover, this solution can evaluate an effect of a strategy which is inputted by the user for affecting the target factor. This solution can also recommend an optimal strategy which enables the target factor to reach a desirable value to the user.

As used herein, the term "factor" is also referred to as a "variable". The term "observation sample" refers to a set of observation values of a number of factors that can be directly observed, and a factor that can be directly observed is also referred to as "observable variable" or "observable factor". The term "target factor" refers to a factor that people expect to affect. For example, in the field of marketing research, the observable factors may include factors related to customer attributes (such as, a customer level, a customer phone number, etc.), factors related to customer behaviors (such as, traffic consumed per month, ratio of free traffic, total cost of the traffic consumed per month, etc.), factors related to customer feedback (for example, the number of complaints, customer satisfaction) and factors related to strategies (for example, the number of reminders for a specific event, etc.). The customer satisfaction may be considered as the target factor. As another example, in the field of software development, the observable factors may include an amount of human resources for software development, time duration for software development, the number of functions, the number of code lines, a programming language used for software development, software failure rate, and so on. For example. the software failure rate can be considered as the target factor. An observation sample may include a set of observation values of the observable factors.

Some example embodiments of the present disclosure will be described below with reference to the figures. However, those skilled in the art would readily appreciate that the detailed description given herein with respect to these figures is provided only for the purpose of illustration, without suggesting any limitation to the scope of the present disclosure.

FIG. 1A illustrates an example environment 100 in which embodiments of the present invention can be implemented. As shown in FIG. 1A, the environment 100 may include a user 110, a causal analysis server 120 and a data collection device 130. The causal analysis server 120 may include a user interface module 121, a causal analysis engine 122 and a database 123. It is to be understood that the structures of the environment 100 and/or the causal analysis server 120 are shown only for purpose of illustration, without suggesting any limitation to the scope of the present disclosure. Embodiments of the present disclosure may also be applied to a different environment with a different structure and/or a different causal analysis server with different components.

In some embodiments, the data collection device 130 may be configured to collect observation samples of a plurality of factors automatically. Each observation sample may include a set of observation values of the plurality of factors. In some embodiments, the data collection device 130 may include one or more sensors for collecting the observation samples. Alternatively, in some embodiments, the data collection device 130 may include one or more collection units for collecting observation values of different types of factors, respectively.

In some embodiments, the data collection device 130 may transmit the collected observation samples to the causal analysis server 120 for subsequent storage, processing and/or analysis. For example, the observation samples collected by the data collection device 130 may be transmitted to the causal analysis server 120 via the user input interface module 121. Then, the observation samples may be transmitted from the user input interface module 121 to the causal analysis engine 122 for subsequent storage, processing and/or analysis. For example, the causal analysis engine 122 may discover a causal relationship among the plurality of factors and/or perform causal analysis based on the observation samples. Alternatively, in some embodiments, the data collection device 130 can be omitted. For example, the observation samples can be inputted to the server 120 by the user 110.

In some embodiments, the user 110 can communicate with the causal analysis system 120. For example, the user 110 may input user information, observation samples, one or more requests, useful knowledge and/or one or more configurations for causal analysis to the causal analysis server 120 via the user input interface module 121. The user inputs may be transmitted from the user input interface module 121 to the causal analysis engine 122. In some embodiments, in response to receiving the user inputs, the causal analysis engine 122 may execute one or more actions for causal analysis associated with the user inputs, and present one or more results or feedbacks to the user 110 via the user interface module 121. The causal analysis engine 122 may store the received data, generated structures, expert knowledge and/or any useful information into the database 123 for subsequent use.

Figure 1B:
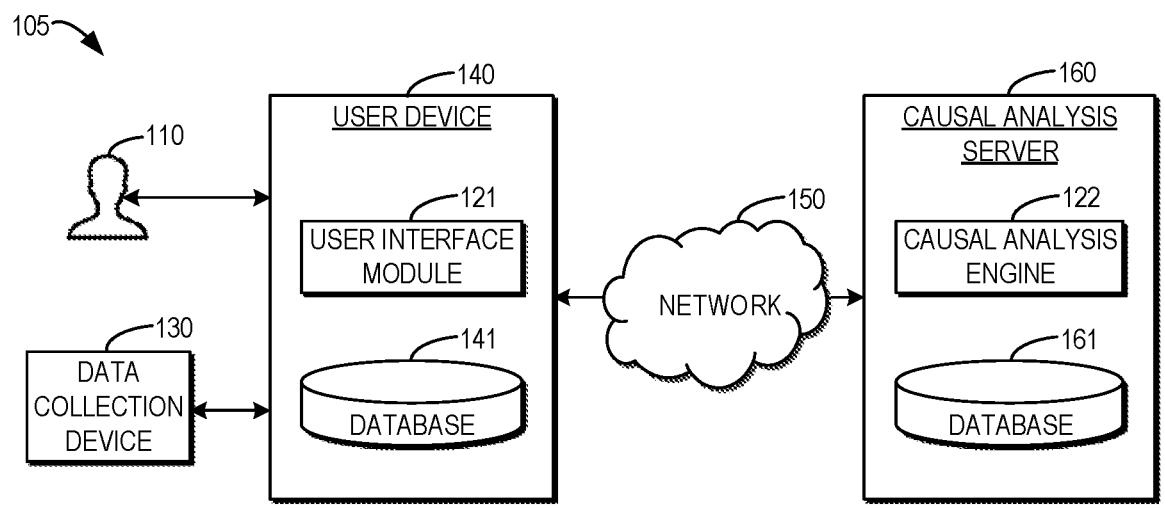
FIG. 1B illustrates another example environment in which embodiments of the present invention can be implemented.

FIG. 1B illustrates another example environment 105 in which embodiments of the present invention can be implemented. As shown in FIG. 1B, the environment 105 may include the user 110, the data collection device 130 (which is the same as or similar to the data collection device 130 as shown in FIG. 1A), a user device 140 and a causal analysis server 160. For example, the user device 140 can communicate with the causal analysis server 160 via a network 150, such as, Internet. It is to be understood that the structures of the environment 105, the user device 140 and/or the causal analysis server 120 are shown only for purpose of illustration, without suggesting any limitation to the scope of the present disclosure. Embodiments of the present disclosure may also be applied to a different environment, a different user device and/or a different causal analysis server.

As used herein, the term "user device" may refer to any device having wireless or wired communication capabilities. Examples of the user device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As shown in FIG. 1B, for example, the user device 140 may include the user interface module 121 (which is the same as to similar to the user interface module 121 as shown in FIG. 1A) and a local database 141. In some embodiments, the user device 140 may receive, via the user interface module 121, the observation samples from the data collection device 130, and/or receive, via the user interface module 121, the user inputs from the user 110. The user device 140 may store the received observation samples, data, expert knowledge, and/or useful information at the local database 141 for subsequent use. The user device 140 may further transmit the received observation samples, data and/or information to the causal analysis server 160 via the network 150 for subsequent processing and/or analysis.

As shown in FIG. 1B, for example, the causal analysis server 160 may include the causal analysis engine 122 (which is the same as to similar to the causal analysis engine 122 as shown in FIG. 1A) and a database 161. In some embodiments, in response to receiving the observation samples of the plurality of factors, the causal analysis engine 122 may discover a causal relationship among the plurality of factors and/or perform causal analysis based on the observation samples. In response to receiving user inputs (such as, user information, observation samples, one or more requests, useful knowledge and/or one or more configurations for causal analysis), the causal analysis engine 122 may execute one or more actions for causal analysis associated with the user inputs and transmit one or more results or feedbacks back to the user device 140. The causal analysis engine 122 may store the received data, generated structures, expert knowledge and/or any useful information into the database 161 for subsequent use. The user device 140 may present the one or more results or feedbacks to the user 110 via the user interface module 121.

Figure 2A:
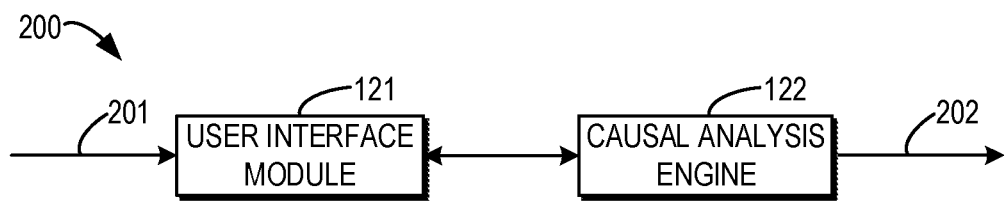
FIG. 2A illustrates an example system for causal analysis in accordance with some embodiments of the present disclosure.

FIG. 2A illustrates a general system 200 for causal analysis in accordance with some embodiments of the present disclosure. As shown in FIG. 2A, the user interface module 121 may receive one or more inputs 201 from the user 110 and/or the data collection device 130. The user interface module 121 may transmit the one or more inputs 201 to the causal analysis engine 122. The causal analysis engine 122 may perform actions associated with the one or more inputs 201. The causal analysis engine 122 may generate one or more outputs 202 by performing the actions. Alternatively, or in addition, the causal analysis engine 122 may transmit the one or more outputs 202 back to the user interface module 121 so as to present them to the user 110.

Figure 2B:
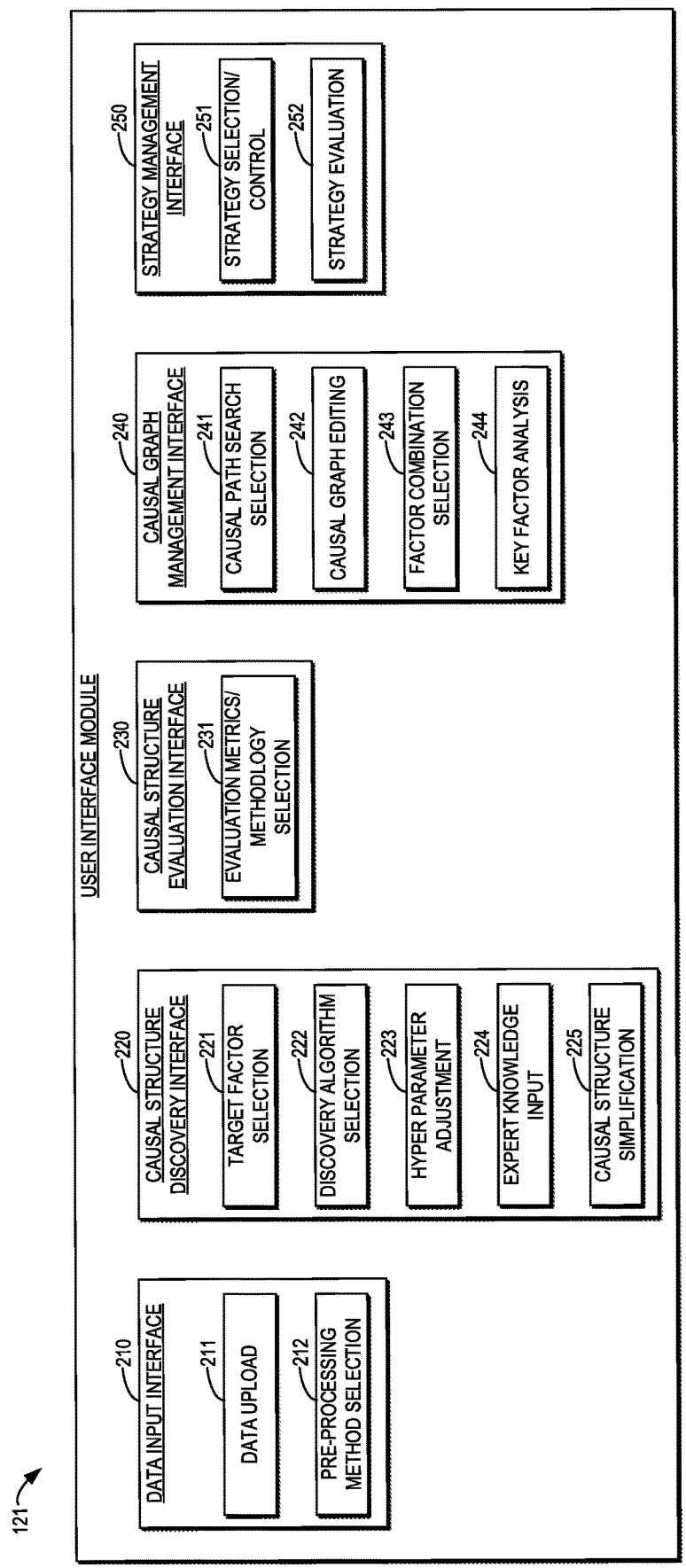
FIG. 2B illustrates a block diagram of an example causal analysis engine in accordance with some embodiments of the present disclosure.

FIG. 2B illustrates an example block diagram of the user interface module 121 in accordance with some embodiments of the present disclosure. As shown in FIG. 2B, the user interface module 121 may include at least one of a data input interface 210, a causal structure discovery interface 220, a causal structure evaluation interface 230, a causal graph management interface 240, and a strategy management interface 250. It is to be understood that the interfaces shown in FIG. 2B are illustrated only for the purpose of illustration, without suggesting any limitation to the scope of the present disclosure. The user interface module 121 may provide any suitable number of interfaces adapted for implementing embodiments of the present disclosure. For example, in some embodiments, the user interface module 121 may also provide a login interface which allows the user 110 to login or log out of the causal analysis engine 122.

In some embodiments, the data input interface 210 may allow the user 110 or the data collection device 130 to prepare data (such as, observation samples of a plurality of factors) in a format supported by the causal analysis engine 122. The data input interface 210 may also allow the user 110 to translate sensitive information in the data into non-sensitive information.

As shown in FIG. 2B, in some embodiments, the data input interface 210 may provide a data upload interface 211, which allows the user 110 or the data collection device 130 to upload the data (such as, the observation samples of the plurality of factors). The uploaded data may then transmitted to the causal analysis engine 122.

Alternatively, or in addition, in some embodiments, the data input interface 210 may also provide a pre-processing method selection interface 212, which allows the user 110 to select a data preprocessing method from one or more data preprocessing methods supported by the causal analysis engine 122, which may help to improve the data quality.

In some embodiments, the causal structure discovery interface 220 may provide a target factor selection interface 221, which allows the user 110 to specify the target factor (such as, the customer satisfaction, the product yields, the software failure rate, etc.) in the plurality of factors.

Alternatively, or in addition, in some embodiments, the causal structure discovery interface 220 may also provide a discovery algorithm selection interface 222. The discovery algorithm selection interface 222 may present a group of causal discovery algorithms supported by the causal analysis engine 122 to the user 110 for selection. For example, different causal discovery algorithms may be applicable for different kinds of datasets, such as, discrete data, continuous data, mixed data, and so on. In some embodiments, the discovery algorithm selection interface 222 may allow the user 110 to select, from the group of causal discovery algorithms, a suitable causal discovery algorithm to be used in the following discovery of a causal structure.

Alternatively, or in addition, in some embodiments, the causal structure discovery interface 220 may also provide a hyper parameter adjustment interface 223, which allows the user 110 to adjust some hyper parameters of the selected causal discovery algorithm, so as to improve the speed and/or accuracy of the causal structure discovery.

Alternatively, or in addition, in some embodiments, the causal structure discovery interface 220 may also provide an expert knowledge input interface 224, which allows the user 110 to input expert knowledge about causality among the plurality of factors, so as to improve the speed and/or accuracy of the causal structure discovery. Examples of the expert knowledge may include but not limited to: there is direct causality between two factors; there is no direct causality between two factors; one factor is an indirect cause of another factor; a set of factors are not a cause of another set of factors; and so on. The inputted expert knowledge may be stored at a database for subsequent use.

Alternatively, or in addition, in some embodiments, the causal structure discovery interface 220 may also provide a causal structure simplification interface 225, which allows the user 110 to initiate an independent test to optimize the discovered causal structure, for example, to delete some unreasonable causal relations from the discovered causal structure.

In some embodiments, the causal structure evaluation interface 230 may allow the user 110 to initiate evaluations of the discovered causal structure under a variety of evaluation metrics and/or evaluation methodologies, so as to identify the fitness of the discovered causal structure to the observation samples of the plurality of factors. In some embodiments, the causal structure evaluation interface 230 may provide an evaluation metrics/methodology selection interface 231, which allows the user 110 to select an evaluation metric and/or an evaluation methodology to be used for evaluating the discovered causal structure.

In some embodiments, the discovered causal structure may be presented as a graph, which is also referred to "causal graph" in the following. For example, the causal graph may include a plurality of nodes corresponding to the plurality of factors and one or more edges connecting the plurality of nodes. An edge connecting two nodes may indicate causality between two factors corresponding to the two nodes, which is also referred to as a "causal edge" in the following.

In some embodiments, the causal graph management interface 240 may provide a causal path search selection interface 241, which allows the user 110 to select any two factors from the plurality of factors and initiate a search for causal paths between the selected two factors.

Alternatively, or in addition, in some embodiments, the causal graph management interface 240 may also provide a causal graph editing interface 242, which allows the user 110 to edit the presented causal graph to input some expert knowledge for optimizing the causal graph. In some embodiments, the editing performed by the user 110 on the causal graph may include any of the following: adding an edge to the causal graph for indicating direct causality between two nodes; removing an existing edge from the causal graph for indicating no direct causality between two nodes; redirecting an existing edge in the causal graph for redirecting causality between two nodes; or adding one or more labels to the causal graph for indicating some prior knowledge. The expert knowledge may be then used for optimizing the discovered causal graph. In some embodiments, if the expert knowledge conflicts with those stored previously, an indication of the conflict may be presented to the user 110 via the causal graph management interface 240 (such as, the causal graph editing interface 242).

Alternatively, or in addition, in some embodiments, the causal graph management interface 240 may also provide a factor combination selection interface 243, which allows the user 110 to enable or disable a factor combination operation on the discovered causal graph. For example, the factor combination operation may combine two or more factors in the discovered causal graph into one factor, so as to optimize or simplify the discovered causal graph. The factor combination operation may be performed based on confirmatory factor analysis (CFA) or explorative factor analysis (EFA).

In some embodiments, a factor combination selection interface same as or similar to the factor combination selection interface 243 may also be provided by the causal structure discovery interface 220, such that the factor combination operation can be performed prior to the causal structure being discovered in order to facilitate the discovery of the causal structure.

Alternatively, or in addition, in some embodiments, the causal graph management interface 240 may also provide a key factor analysis interface 244, which allows the user 110 to select a target factor and input the number of key factors affecting the target factor to be retrieved. The key factor analysis interface 244 may then present, to the user 110, the key factors that affect the target factor. For example, the key factors may be ranked according to their causal effects on the target factor.

In some embodiments, the strategy management interface 250 may provide a strategy selection/control interface 251, which allows the user 110 to input constraints on one or more factors, such as, the sales volume of a product exceeding an expected sales volume while the price of the product falling within a range from 5 dollars to 9 dollars. The strategy selection/control interface 251 may then automatically present one or more control strategies satisfying those constraints, as well as present respective effects of these control strategies.

Alternatively, or in addition, the strategy management interface 250 may also provide a strategy evaluation interface 252, which allows the user 110 to input one or more strategies for evaluation. For example, a strategy inputted by the user 110 may indicate values of at least one factor affecting the target factor. The strategy evaluation interface 252 may then present respective effects of these strategies if they are carried out, and will allow the user 110 to select the optimal strategy according to the presented effects.

It is to be understood that each interface in the user interface module 121 as described above may interact with a corresponding module or unit in the causal analysis engine 122. Example modules or units in the causal analysis engine 122 will be described with reference to FIGS. 2C-2E in the following.

Figure 2C:
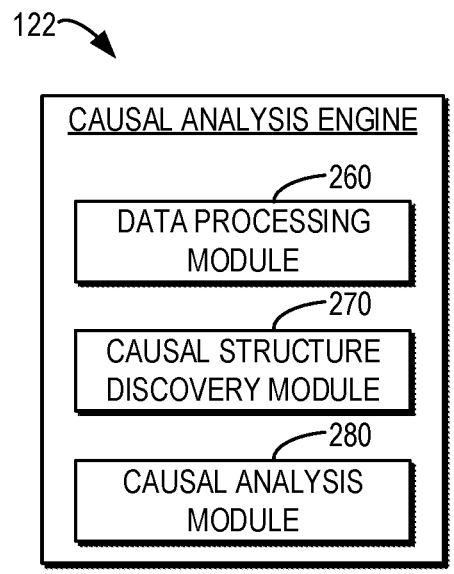
FIG. 2C illustrates block diagrams of an example data processing module and an example causal structure discovery module in the causal analysis engine in accordance with some embodiments of the present disclosure.

FIG. 2C illustrates a block diagram of an example causal analysis engine 122 in accordance with some embodiments of the present disclosure. As shown in FIG. 2B, for example, the causal analysis engine 122 may include a data processing module 260, a causal structure discovery module 270 and a causal analysis module 280. It is to be understood that the modules of the causal analysis engine 122 are shown only for purpose of illustration, without suggesting any limitation to the scope of the present disclosure. In some embodiments, the causal analysis engine 122 may include additional modules and/or omit some module as shown. For example, in some embodiments, the data processing module 260 may be omitted.

In some embodiments, the data processing module 260 may receive observation data (such as, the observation samples of the plurality of factors) from the data input interface 210 and perform a data pre-processing on the received observation data. The data processing module 260 may also receive information from the causal structure discovery interface 220 and perform further processing to optimize the factors for which a causal structure is to be discovered. Example function units in the data processing module 260 will be described with reference to FIG. 2D in the following.

Figure 2D:
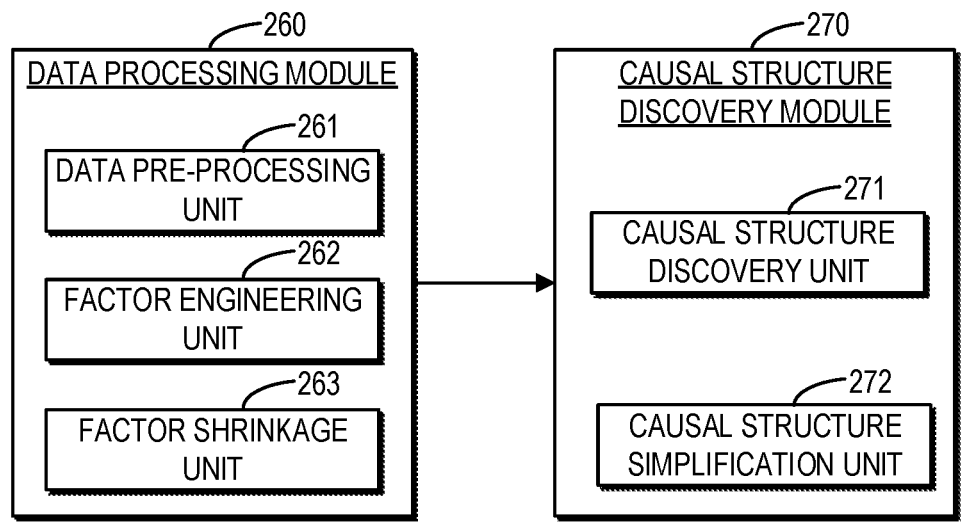
FIG. 2D illustrates a block diagram of an example causal analysis module in the causal analysis engine in accordance with some embodiments of the present disclosure.

FIG. 2D illustrates a block diagram of an example data processing module 260 in accordance with some embodiments of the present disclosure. As shown in FIG. 2D, for example, the data processing module 260 may include at least one of a data pre-processing unit 261, a factor engineering unit 262 and a factor shrinkage unit 263. It is to be understood that the units of the data processing module 260 are shown only for purpose of illustration, without suggesting any limitation to the scope of the present disclosure. In some embodiments, the data processing module 260 may include additional units and/or omit some unit as shown. For example, in some embodiments, the factor engineering unit 262 and/or the factor shrinkage unit 263 may be omitted.

In some embodiments, the data (such as, the observation samples of the plurality of factors) uploaded via the data input interface 210 may be provided to the data pre-processing unit 261 for data pre-processing. In some embodiments, the data pre-processing unit 261 may provide a data cleaning function which may process and clean noisy data that is not in a reasonable range (for example, age is 200, a price discount is 1.2, etc.). In some embodiments, the data pre-processing unit 261 may provide several methods to fill in a missing value in the data, such as, using a mean value, a nearby value, a predicted value or the like to fill in the missing value in the data. In some embodiments, the data pre-processing unit 261 may provide a data filtering function which may automatically remove observation samples/variables with a missing ratio exceeding a threshold set by the user 110. Alternatively, or in addition, in some embodiments, the data pre-processing unit 261 may provide a data statistic function which may perform statistic on the uploaded data, such as, calculating the maximum, minimum, mean, or variance value for each observable variable, calculating a missing ratio for each observable variable and so on. The preprocessed data can also be stored in a database (such as, the database 123 as shown in FIG. 1A or the database 161 as shown in FIG. 1B) for subsequent use.

In some embodiments, the factor engineering unit 262 may analyze characters of the plurality of factors based on the observation samples and optimize the plurality of original factors into a group of new factors. These new factors can reflect the characters of the original factors, such as, change rates of the original factors in a certain time period or on a certain dimension, so as to facilitate the discovery of the causal relationship/structure. It is to be understood that, in some embodiments, the factor engineering unit 262 can be omitted.

In some embodiments, as described above, the causal structure discovery interface 220 (such as, the target factor selection interface 221) may allow the user 110 to specify the target factor (such as, the customer satisfaction, the product yields, the software failure rate, etc.) in the plurality of factors. The factor shrinkage unit 263 may receive an indication of the target factor from the causal structure discovery interface 220 and use some analysis technology to delete, from the plurality of factors, one or more factors which are unlikely to be a cause of the target factor, so as to improve the efficiency of the following discovery of the causal relationship/structure. It is to be understood that, in some embodiments, the factor shrinkage unit 263 can be omitted.

With reference back to FIG. 2C, in some embodiments, the causal structure discovery module 270 may discover, from the observation samples of the plurality of factors, a causal relationship/structure among the plurality of factors. Example function units in the causal structure discovery module 270 will be described with reference to FIG. 2D in the following.

FIG. 2D illustrates a block diagram of an example causal structure discovery module 270 in accordance with some embodiments of the present disclosure. As shown in FIG. 2D, for example, the causal structure discovery module 270 may include at least one of a causal structure discovery unit 271 and a causal structure simplification unit 272. It is to be understood that the units of the causal structure discovery module 270 are shown only for purpose of illustration, without suggesting any limitation to the scope of the present disclosure. In some embodiments, the causal structure discovery module 270 may include additional units and/or omit some unit as shown. For example, in some embodiments, the causal structure simplification unit 272 may be omitted.

In some embodiments, as described above, the causal structure discovery interface 220 may allow the user 110 to select, from a group of causal discovery algorithms, a suitable causal discovery algorithm to be used in the discovery of the causal relationship. Alternatively, or in addition, in some embodiments, the causal structure discovery interface 220 may also allow the user 110 to adjust some hyper parameters of the selected causal discovery algorithm, so as to improve the speed and/or accuracy of the causal analysis. Alternatively, or in addition, in some embodiments, the causal structure discovery interface 220 may also allow the user 110 to input expert knowledge about causality among the plurality of factors, so as to improve the speed and/or accuracy of the causal structure discovery. Indications of the selected causal discovery algorithm, the adjusted hyper parameters and/or the expert knowledge may be provided to the causal structure discovery module 270.

In some embodiments, the causal structure discovery module 270 may discover, from the observation samples of the plurality of factors, a causal relationship among the plurality of factors based on the selected causal discovery algorithm, the adjusted hyper parameters and/or the expert knowledge. The causal structure discovery module 270 may generate a causal structure representing the discovered causal relationship. In some embodiments, the generated causal structure can be presented in different visual forms, such as, a form, a causal graph, or so on. In some embodiments, the generated causal structure may be presented as a causal graph. For example, the causal graph may include a plurality of nodes corresponding to the plurality of factors and one or more causal edges connecting the plurality of nodes. In some embodiments, as described above, the user 110 may initiate an independent test to optimize the discovered causal structure via the causal structure discovery interface 220 (such as, the causal structure simplification interface 225). In some embodiments, in this case, the causal structure simplification unit 272 may receive an indication from the causal structure simplification interface 225 and apply an independent test technique to optimize the generated causal graph, such as, to delete some unreasonable causal edges from the generated causal graph. In some embodiments, the generated and/or optimized causal graph can be provided to the causal structure discovery interface 220 for presentation to the user 110. Additionally, the generated and/or optimized causal graph may also be stored in a database (such as, the database 123 as shown in FIG. 1A or the database 161 as shown in FIG. 1B) for subsequent use.

With reference back to FIG. 2C, in some embodiments, the causal analysis module 280 may perform actions for causal analysis based on one or more user inputs via the causal structure evaluation interface 230, the causal graph management interface 240 and/or the strategy management interface 250. Example function units in the causal analysis module 280 will be described with reference to FIG. 2E in the following.

Figure 2E:
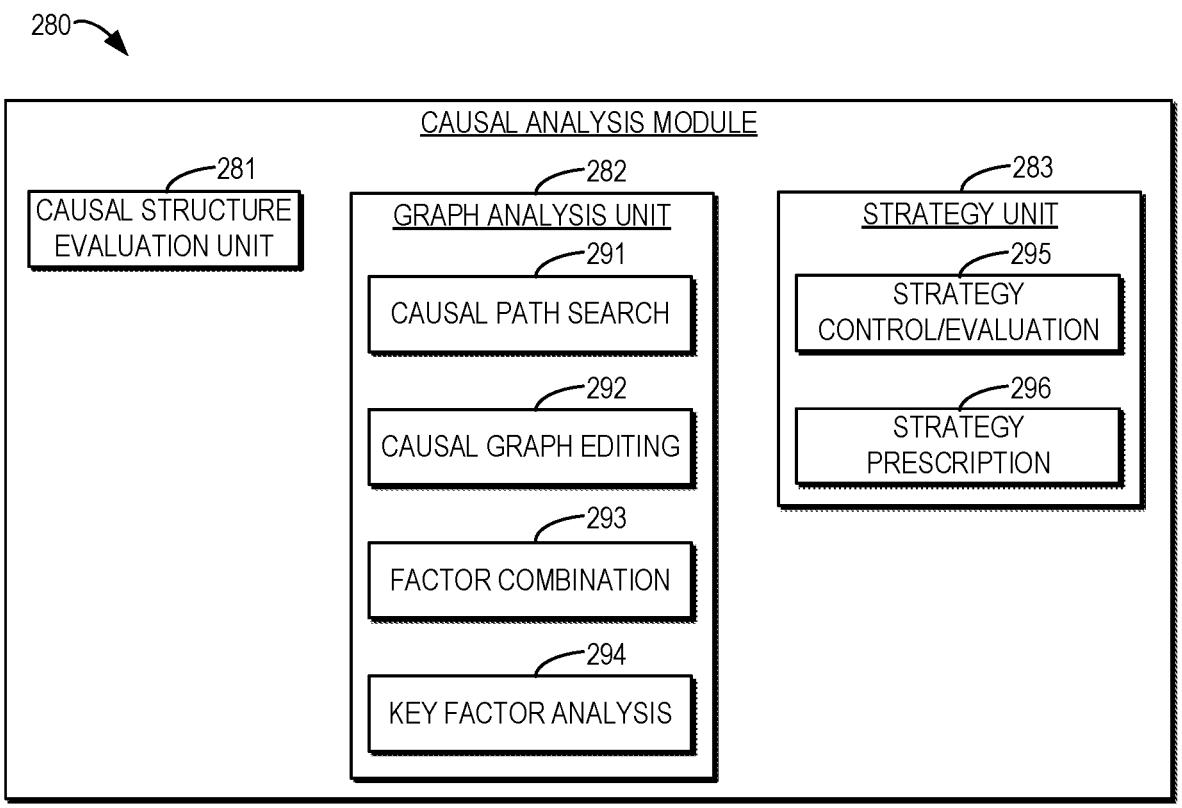
FIG. 2E illustrates a block diagram of an example user interface module in accordance with some embodiments of the present disclosure.

FIG. 2E illustrates a block diagram of an example causal analysis module 280 in accordance with some embodiments of the present disclosure. As shown in FIG. 2E, for example, the causal analysis module 280 may include a causal structure evaluation unit 281 which may interact with the causal structure evaluation interface 230, a graph analysis unit 282 which may interact with the causal graph management interface 240 and a strategy unit 283 which may interact with the strategy management interface 250. For example, the graph analysis unit 282 may include a causal path search function 291, a causal graph editing function 292, a factor combination function 293 and a key factor analysis function 294. The strategy unit 283 may include a strategy control/evaluation function 295 and a strategy prescription function 296. It is to be understood that the units or functions in the causal analysis module 280 are shown only for purpose of illustration, without suggesting any limitation to the scope of the present disclosure. In some embodiments, the causal analysis module 280 may include additional units or functions, and/or omit some unit or function as shown. For example, in some embodiments, the factor combination function 293 may be omitted.

In some embodiments, as described above, the causal structure evaluation interface 230 allow the user 110 to initiate evaluations of the discovered causal structure under a variety of evaluation metrics and/or evaluation methodologies, so as to identify the fitness of the discovered causal structure to the observation samples of the plurality of factors. For example, the evaluation metrics/methodology selection interface 231 may allow the user 110 to select an evaluation metric and/or an evaluation methodology to be used for evaluating the discovered causal structure. The evaluation metric may be an absolute metric or a relative metric. Examples of the absolute metric may include, but not limited to, Root Mean Square Error of Approximation (RMSEA), Standardized Root Mean Square Residual (SRMR), Bayesian information criterion (BIC), and so on. RMSEA is related to residual in the model. RMSEA values range from 0 to 1 with a lower RMSEA value indicating better model fit. For example, acceptable model fitness may be indicated by an RMSEA value of 0.05 or less. SRMR is an overall badness-of-fit measure that is based on the fitted residuals. SRMR closing to zero may indicate a good fit. A rule of thumb is that the SRMR should be less than 0.05 for a good fit, whereas values smaller than 0.10 may be interpreted as acceptable. BIC is a score considering the balance of data fitting and model sparsity. For example, the model with the lowest BIC is preferred. Examples of the relative metric may include, but not limited to, Comparative Fit Index (CFI), Non-normed Fit Index(NNFI) or Tucker-Lewis Index (TLI), and so on. CFI is equal to the discrepancy function adjusted for sample size. CFI ranges from 0 to 1 with a larger value indicating better model fit. A rule of thumb for this index is that 0.97 is indicative of a good fit relative to the independence model, while values greater than 0.95 may be interpreted as an acceptable fit. NNFI or TLI (they are the same) values range from 0 to 1, with a higher value indicating better fit. This index greater than 0.97 is indicative of a good fit relative to the independence model, whereas values greater than 0.95 may be interpreted as an acceptable fit.

In some embodiments, an indication of the selected evaluation metric and/or evaluation methodology may be provided to the causal structure evaluation unit 281. The causal structure evaluation unit 281 may evaluate the discovered causal structure under the selected evaluation metric and/or evaluation methodology, so as to identify the fitness of the discovered causal structure to the observation samples of the plurality of factors. The causal structure evaluation unit 281 may provide a result of the evaluation to the causal structure evaluation interface 230 for presentation to the user 110.

In some embodiments, the graph analysis unit 282 which includes at least one of the causal path search function 291, the causal graph editing function 292, the factor combination function 293 and the key factor analysis function 294 may interact with the causal graph management interface 240.

As described above, the causal graph management interface 240 (such as, the causal path search selection interface 241) may allow the user 110 to select any two factors from the plurality of factors and initiate a search for causal paths between the selected two factors. In some embodiments, an indication of the selected factors may be provided to the causal path search function 291. The causal path search function 291 may search the discovered causal structure (such as, the causal graph) for causal paths between the selected two factors. The causal path search function 291 may provide the causal paths to the causal graph management interface 240 for presentation to the user 110.

As described above, in some embodiments, the causal graph management interface 240 (such as, the causal graph editing interface 242) may allow the user 110 to edit the presented causal graph to input some expert knowledge for optimizing the causal graph. In some embodiments, the editing performed by the user 110 on the causal graph may include any of the following: adding an edge to the causal graph for indicating direct causality between two nodes; removing an existing edge from the causal graph for indicating no direct causality between two nodes; redirecting an existing edge in the causal graph for redirecting causality between two nodes; or adding one or more labels to the causal graph for indicating some expert knowledge. The expert knowledge indicated by the editing on the causal graph may be compared with the expert knowledge stored previously. In some embodiments, if there is a conflict, an indication of the conflict may be presented to the user 110 via the causal graph management interface 240 (such as, the causal graph editing interface 242). In some embodiments, if there is no conflict, the expert knowledge indicated by the editing on the causal graph may be stored at a database for subsequent use. In addition, the expert knowledge indicated by the editing on the causal graph may be provided to the graph analysis unit 282 (such as, the causal graph editing function 292).

In some embodiments, the graph analysis unit 282 may re-discover the causal relationship/structure among the plurality of factors based on the expert knowledge and the observation samples of the plurality of factors and regenerate a further causal structure (such as, a further causal graph) representing the re-discovered causal relationship. The regenerated causal structure may integrate the expert knowledge and reflect the editing performed on the initial causal graph. For example, the regenerated causal structure can be provided to the causal graph management interface 240 for presentation to the user 110. Additionally, the regenerated causal structure/graph may also be stored in a database (such as, the database 123 as shown in FIG. 1A or the database 161 as shown in FIG. 1B) for subsequent use.

As described above, in some embodiments, the causal graph management interface 240 (such as, the factor combination selection interface 243) may allow the user 110 to enable or disable a factor combination operation on the discovered causal graph. An indication for enabling or disabling the factor combination operation may be provided to the graph analysis unit 282 (such as, the factor combination function 293). The factor combination function 293 may perform the factor combination operation by combining two or more factors in the discovered causal graph into one factor, so as to optimize or simplify the discovered causal graph. The factor combination operation may be performed based on confirmatory factor analysis (CFA) or explorative factor analysis (EFA). The optimized or simplified causal graph may be provided to the causal graph management interface 240 for presentation to the user 110. Additionally, the optimized or simplified causal structure/graph may also be stored in a database (such as, the database 123 as shown in FIG. 1A or the database 161 as shown in FIG. 1B) for subsequent use.

As described above, in some embodiments, the causal graph management interface 240 (such as, the key factor analysis interface 244) may allow the user 110 to select a target factor and input the number of key factors affecting the target factor to be retrieved. The target factor and the number of the key factors may be indicated to the graph analysis unit 282 (such as, the key factor analysis function 294). In some embodiments, the key factor analysis function 294 may search the causal graph for those factors affecting the target factor. Each factor may be assigned with a score to reflect its importance on the target factor. The key factor analysis function 294 may provide the key factors as well as their causal effects on the target factor to the causal graph management interface 240 for presentation to the user 110. In some embodiments, for example, the causal graph management interface 240 may highlight one or more nodes corresponding to the key factors on the causal graph. Alternatively, or in addition, the causal graph management interface 240 may also present visual representations (such as, text, numbers, progress bars, pie chart, bar chart, etc.) of importance of the key factors.

In some embodiments, the strategy unit 283 which includes the strategy control/evaluation function 295 and the strategy prescription function 296 may interact with the strategy management interface 250.

As described above, in some embodiments, the strategy management interface 250 (such as, the strategy selection/control interface 251) may allow the user 110 to input constraints on one or more factors, such as, the sales volume of a product exceeding an expected sales volume while the price of the product falling within a range from 5 dollars to 9 dollars. The constraints on the one or more factors may be provided to the strategy unit 283 (such as, the strategy prescription function 296). In some embodiments, the strategy prescription function 296 may determine one or more strategies satisfying the constraints based on the causal graph. In some embodiments, if the strategy prescription function 296 is unable to find a strategy satisfying all of the constraints, the strategy prescription function 296 may try to find one or more strategies which can satisfy at least a part of the constraints. In some embodiments, the strategy prescription function 296 may find one or more strategies which can cause a predicted value of the target factor (such as, the sales volume of the product) to approach the expected sales volume (such as, a difference between the predicted sales volume of the product and the expected sales volume is below a threshold). The strategy prescription function 296 may provide the determined one or more strategies as well as respective effects of these strategies to the strategy management interface 250 for presentation to the user 110. The strategy management interface 250 may allow the user 110 to select the optimal strategy according to the presented effects.

As described above, in some embodiments, the strategy management interface 250 (such as, the strategy evaluation interface 252) may allow the user 110 to input one or more strategies for evaluation. For example, a strategy inputted by the user 110 may indicate values of at least one factor affecting the target factor. The inputted strategy may be provided to the strategy unit 283 (such as, the strategy control/evaluation function 295). In some embodiments, the strategy control/evaluation function 295 may execute a simulation to predict a value of the target factor based on the causal graph and the values of the at least one factor indicated by the strategy. The strategy control/evaluation function 295 may provide the predicted value of the target factor to the strategy management interface 250 for presentation to the user 110. In this way, the user 110 can foresee an effect of the strategy if the strategy is carried out.

The interactions between the user interface module 121 and the causal analysis engine 122 are summarized in FIG.

Figure 3:
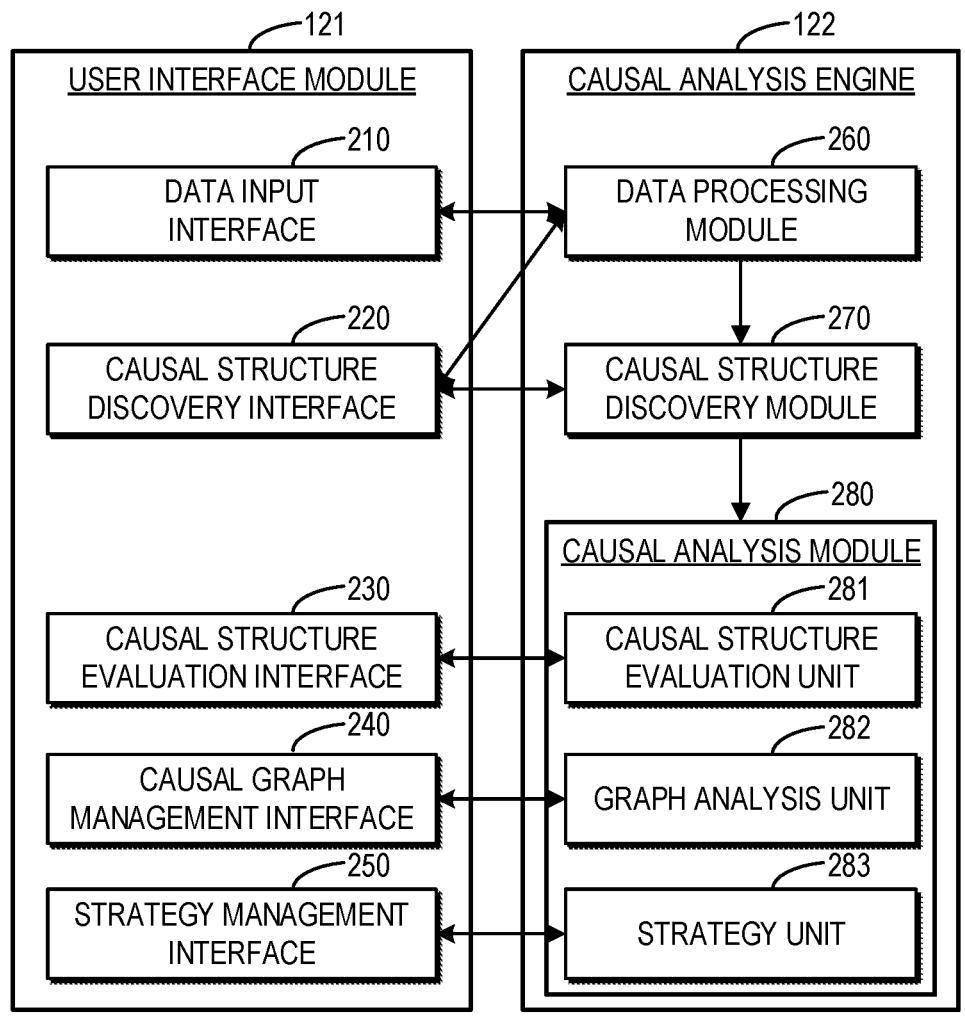
FIG. 3 illustrates interactions between the user interface module and the causal analysis engine in accordance with some embodiments of the present disclosure.

3. As shown in FIG. 3 and as described above with reference to FIGS. 2B-2E, the data input interface 210 may interact with the data processing module 260. The causal structure discovery interface 220 may interact with the data processing module 260 and/or the causal structure discovery module 270. The observation data processed by the data processing module 260 may be provided to the causal structure discovery module 270. The causal structure discovered by the causal structure discovery module 270 may be provided to the causal analysis module 280 which includes the causal structure evaluation unit 281, the graph analysis unit 282 and the strategy unit 283. As shown in FIG. 3 and as described above with reference to FIGS. 2B-2E, the causal structure evaluation interface 230 may interact with the causal structure evaluation unit 281 in the causal analysis module 280. The causal graph management interface 240 may interact with the graph analysis unit 282 in the causal analysis module 280. The strategy management interface 250 may interact with the strategy unit 283 in the causal analysis module 280.

In some embodiments, the causal analysis engine 122 may further include a display control module (not shown in figures). The display control module may control the display of the discovered causal structure (such as, the causal graph) in response to an operation of the user 110. The display control module may be configured to perform at least one of following actions: (1) indicating causal importance of a factor on the target factor by changing at least one of a size and a color of the factor; (2) indicating causal importance between related factors by changing at least one of thicknesses and colors of edges (or arrows) associated with the factors; (3) indicating whether the target factor is selected or not by changing the shape of the target factor in the causal graph; (4) presenting a chart in which a factor with higher overall importance is ranked on top of another factor with lower overall importance; (5) relocating factors in a specific shape (for example, a circle) to show a density of causality among the factors; (6) shuffling factors in the causal graph to show a simplified graph having shorter edges (or arrows) among factors according to causal importance; (7) indicating a factor with an animation (e.g. blinking) when the user 110 selects a name of the factor; (8) indicating factors having direct causal relations with a selected factor and edges (or arrows) representing the direct causal relations while hiding other factors in response to a predetermined operation of the user 110 (for example, selecting the factor and keeping pressing the factor for a period); (9) keeping edges (or arrows) representing causal relations connected and moving the edges (or arrows) in response to the user 110 moving one or more factors by dragging and dropping; (10) indicating a description of a factor in response to the user 110 selecting the factor and hovering on the factor for a period; (11) controlling showing and hiding of causal importance associated with an edge (or an arrow) on the causal graph; (12) controlling showing and hiding of at least some of edges (or arrows) on the causal graph according to respective causal importance associated with the edges (or arrows); and so on. It is to be understood that a corresponding operation interface may be included in the user interface module 121. The operation interface may be used by the user to trigger execution of at least one of the above actions.

Figure 4:
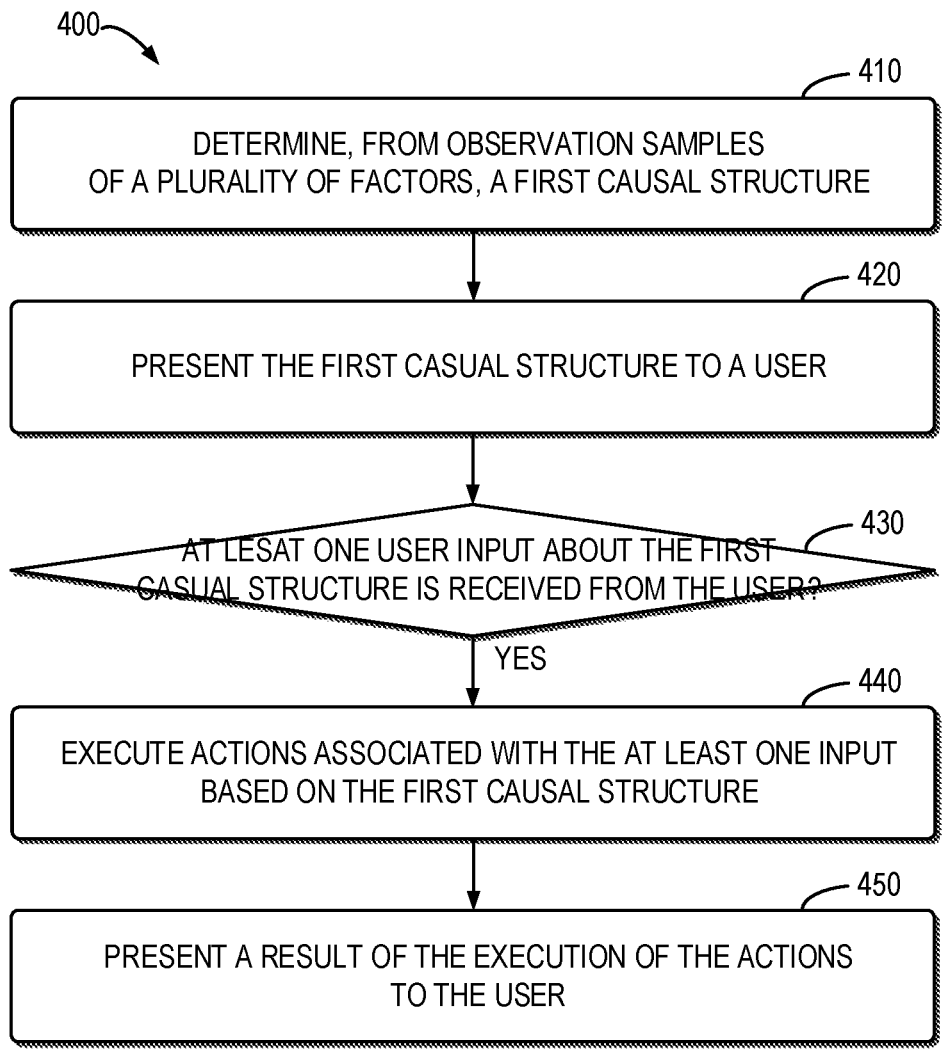
FIG. 4 illustrates an example method for causal analysis in accordance with some embodiments of the present disclosure.

FIG. 4 illustrates an example method 400 in accordance with some embodiments of the present disclosure. The method 400 can be implemented by the causal analysis system 200 as shown in FIG. 2A. In some embodiments, for example, the method 400 can be implemented at the causal analysis server 120 as shown in FIG. 1A. Alternatively, in some embodiments, for example, the method 400 can be implemented at the user device 140 and the causal analysis server 160 as shown in FIG. 1B. It is to be understood that the method 400 may include additional blocks not shown and/or may omit some shown blocks, and the scope of the present disclosure is not limited in this regard.

At block 410, a first causal structure indicating a first causal relationship among a plurality of factors is determined from observation samples of the plurality of factors, each observation sample including a set of observation values of the plurality of factors.

In some embodiments, as described above, the user 110 or the data collection device 130 may upload the observation samples of the plurality of factors via the data input interface 210 (such as, the data upload interface 211). For example, each of the observation samples may include a set of observation values of the plurality of factors. In some embodiments, the uploaded observation samples of the plurality of factors can be processed by the data processing module 260 (such as, one or more of the data pre-processing unit 261, the factor engineering unit 262 and the factor shrinkage unit 263). The causal structure discovery module 270 (such as, the causal structure discovery unit 271) may determine, from the observation samples of the plurality of factors, the first causal structure indicating the first causal relationship among the plurality of factors.

In some embodiments, as described above, the causal structure discovery interface 220 may allow the user 110 to select, from a group of causal discovery algorithms, a suitable causal discovery algorithm to be used in the discovery of the causal relationship. Alternatively, or in addition, the causal structure discovery interface 220 may also allow the user 110 to adjust some hyper parameters of the selected causal discovery algorithm, so as to improve the speed and/or accuracy of the causal analysis. Alternatively, or in addition, the causal structure discovery interface 220 may also allow the user 110 to input expert knowledge about causality among the plurality of factors, so as to improve the speed and/or accuracy of the causal structure discovery. In some embodiments, the causal structure discovery module 270 (such as, the causal structure discovery unit 271) may discover, from the observation samples of the plurality of factors, the first causal relationship among the plurality of factors based on the selected causal discovery algorithm, the adjusted hyper parameters and/or the expert knowledge.

In some embodiments, as described above, the user 110 may initiate an independent test to optimize the discovered causal structure via the causal structure discovery interface 220 (such as, the causal structure simplification interface 225). In some embodiments, the causal structure discovery module 270 (such as, the causal structure simplification unit 272) may receive an indication from the causal structure simplification interface 225 and apply an independent test technique to optimize or simplify the generated causal structure, such as, to delete some unreasonable causal relations from the generated causal structure.

At block 420, the first causal structure is presented to the user 110. The generated causal structure can be presented in different visual forms, such as, a form, a causal graph, or so on. In some embodiments, the first causal structure may be presented as a causal graph. For example, the causal graph may include a plurality of nodes corresponding to the plurality of factors and one or more causal edges connecting the plurality of nodes. In the following, the phrases "causal structure", "causal graph" and "causal relationship" can be used interchangeably. It is to be understood that this is merely for the purpose of illustration, without suggesting any limitation to the scope of the present disclosure.

Figure 5A:
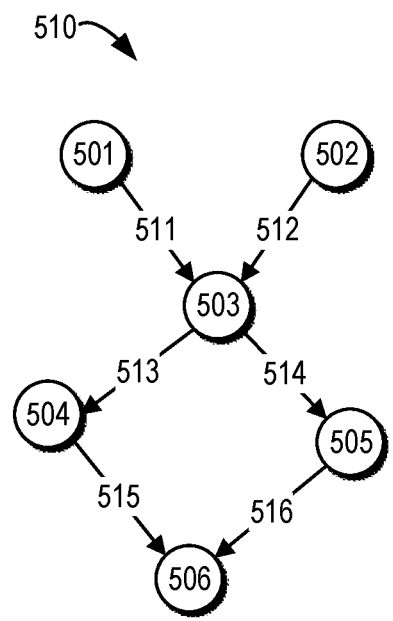
FIGS. 5A-5E illustrate example causal graphs in accordance with some embodiments of the present disclosure.

FIG. 5A illustrates an example causal graph 510 in accordance with some embodiments of the present disclosure. As shown in FIG. 5A, the causal graph 510 includes a plurality of nodes 501, 502 . . . 506 corresponding to a plurality of factors. For the purpose of description, in the following, the node 501 may also be referred to as "factor 501"; the node 502 may also be referred to as "factor 502" . . . the node 506 may also be referred to as "factor 506". It is to be understood that the number of factors in the causal graph 510 is provided only for the purpose of illustration, without suggesting any limitation to the scope of the present disclosure. The causal graph in accordance with embodiments of the present disclosure can include any suitable number of nodes or factors. It is also to be understood that in different fields, the factor 501, 502 . . . or 506 may have different meanings. For example, in the field of marketing research, the factor 501, 502 . . . or 506 may include any of the following: a customer level, a customer phone number, traffic consumed per month, ratio of free traffic, total cost of the traffic consumed per month, the number of complaints, customer satisfaction and so on. In the field of software development, the factor 501, 502 . . . or 506 may include any of the following: an amount of human resources for software development, time duration for software development, the number of functions, the number of code lines, a programming language used for software development, software failure rate, and so on.

As shown in FIG. 5A, the causal graph 510 also includes a plurality of causal edges 511, 512 . . . 516 connecting the plurality of nodes 501, 502 . . . 506. For example, the edge 511 pointing from the node 501 to the node 503 may indicate that the factor 501 is a direct cause of the factor 503; the edge 512 pointing from the node 502 to the node 503 may indicate that the factor 502 is a direct cause of the factor 503 . . . the edge 516 pointing from the node 505 to the node 506 may indicate that the factor 505 is a direct cause of the factor 506. In some embodiments, a causal edge in the causal graph 510 may have different colors. For example, if the edge 511 is of a first color (such as, red), it means that the value of the factor 503 may increase as the value of the factor 501 increases. If the edge 511 is of a second color (such as, blue) different from the first color, it means that the value of the factor 503 may decrease as the value of the factor 501 increases.

At block 430, it is determined if at least one user input about the first causal structure is received from the user 110. In response to the at least one user input being received, at block 440, actions associated with the at least one user input are executed based on the first causal structure. Then, at block 450, a result of the execution of the actions is presented to the user 110.

In some embodiments, the at least one user input may comprise an edit operation performed on the first causal structure (such as, the causal graph) by the user 110. As described above, for example, the causal graph management interface 143 may allow the user 110 to edit the presented causal structure (such as, the causal graph) to input some prior knowledge for optimizing the discovered causal structure. In some embodiments, the editing performed by the user 110 on the causal graph may include any of the following: adding an edge to the causal graph for indicating direct causality between two nodes; removing an existing edge from the causal graph for indicating no direct causality between two nodes; redirecting an existing edge in the causal graph for redirecting causality between two nodes; and adding one or more labels to the causal graph for indicating some prior knowledge.

In some embodiments, the plurality of nodes may comprise a first node (such as, the node 501 in FIG. 5A) corresponding to a first factor from the plurality of factors and a second node (such as, the node 503 in FIG. 5A) corresponding to a second factor from the plurality of factors and the at least one edge may comprise a first edge (such as, the edge 511 in FIG. 5A) pointing from the first node to the second node for indicating that the first factor is a direct cause of the second factor. In some embodiments, the edit operation performed by the user 110 on the causal graph may include removing the first edge from the causal graph, so as to indicate that the first factor is not a direct cause of the second factor. Alternatively, or in addition, in some embodiments, the edit operation performed by the user 110 on the causal graph may include redirecting the first edge to point from the second node to the first node (such as, redirecting the edge 511 to point from the node 503 to the node 501), so as to indicate that the second factor is a direct cause of the first factor.

Alternatively, or in addition, in some embodiments, the plurality of nodes may comprise a third node (such as, the node 502 in FIG. 5A) corresponding to a third factor from the plurality of factors and a fourth node (such as, the node 506 in FIG. 5A) corresponding to a fourth factor from the plurality of factors. In some embodiments, the edit operation performed by the user 110 on the causal graph may include adding a second edge pointing from the third node to the fourth node to the causal graph, so as to indicate that the third factor is a direct cause of the fourth factor. Alternatively, or in addition, in some embodiments, the edit operation performed by the user 110 on the causal graph may include adding a first label associated with the third node and the fourth node to the causal graph, so as to indicate that the third factor is an indirect cause of the fourth factor.

Alternatively, or in addition, in some embodiments, the plurality of nodes comprise a first set of nodes corresponding to a first set of factors from the plurality of factors and a second set of nodes corresponding to a second set of factors from the plurality of factors. In some embodiments, the edit operation performed by the user 110 on the causal graph may include adding a second label associated with the first set of nodes and the second set of nodes to the causal graph, so as to indicate that the first set of factors are not a cause of the second set of factors.

In some embodiments, in response to the edit operation being performed by the user 110, prior information for optimizing the first causal structure may be determined from the edit operation. A second causal relationship among the plurality of factors which is different from the first causal relationship may be determined, based on the information and the observation samples of the plurality of factors. Then, a second causal structure representing the second causal relationship can be presented to the user 110. For example, the second causal structure may integrate the prior information and reflect the editing performed on the first causal structure.

In some embodiments, the at least one user input may comprise a first request to retrieve a first number of factors affecting a target factor from the plurality of factors. For example, the first request may indicate the target factor and the first number (that is, the number of key factors to be retrieved) to the causal analysis system 200. As described above, for example, the causal graph management interface 240 (such as, the key factor analysis interface 244) may allow the user 110 to select a target factor and input the number of key factors affecting the target factor to be retrieved. In some embodiments, in response to receiving the first request, the causal graph management interface 240 (such as, the key factor analysis interface 244) may determine the target factor and the first number (that is, the number of key factors to be retrieved) from the first request. The target factor and the number of the key factors may be indicated to the graph analysis unit 282 (such as, the key factor analysis function 294).

In some embodiments, the graph analysis unit 282 (such as, the key factor analysis function 294) may determine, from the plurality of factors, at least one factor affecting the target factor based on the first causal structure. For example, the at least one factor may include a factor which is a direct cause or an indirect cause of the target factor. The graph analysis unit 282 (such as, the key factor analysis function 294) may estimate respective causal effects of the at least one factor on the target factor based on the observations samples and the first causal structure. The graph analysis unit 282 (such as, the key factor analysis function 294) may rank the at least one factor based on the estimated causal effects (for example, from high to low) and select the first number of key factors (which have greatest causal effects on the target factor) based on a result of the ranking.

In some embodiments, the first number of factors may correspond to the first number of nodes from the plurality of nodes in the causal graph. The causal graph management interface 240 may highlight the first number of nodes in the causal graph. Alternatively, or in addition, the causal graph management interface 240 may present visual representations indicating causal effects of the first number of factors on the target factor to the user 110.

Figure 5B:
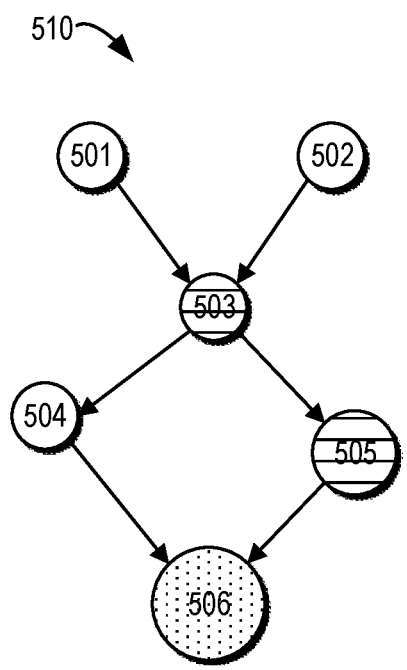

FIG. 5B illustrates the example causal graph 510 which shows the key factors affecting the target factor in accordance with some embodiments of the present disclosure. As shown in FIG. 5B, two key factors 503 and 505 which have greatest effects on the target factor 506 are highlighted on the causal graph 510. In particular, the node 505 is shown bigger than the node 503, which indicates that the causal effect of the factor 505 on the target factor 506 (that is, the importance of the factor 505) exceeds the causal effect of the factor 503 on the target factor 506 (that is, the importance of the factor 503). Alternatively, in some embodiments, other visual representations (such as, text, numbers, progress bars, pie chart, bar chart, etc.) can be used to show respective causal effects of the key factors on the target factor.

In some embodiments, the at least one user input may comprise a second request to obtain a strategy that enables a target factor from the plurality of factors to reach an expected value. For example, the second request may indicate the target factor and the expected value of the target factor to the causal analysis system 200. As described above, for example, the strategy management interface 250 (such as, the strategy selection/control interface 251) may allow the user 110 to input constraints on one or more factors, such as, the sales volume of a product exceeding an expected sales volume while the price of the product falling within a range from 5 dollars to 9 dollars. In some embodiments, in response to receiving the second request, the strategy management interface 250 (such as, the strategy selection/control interface 251) may determine the target factor and the expected value of the target factor from the second request. The target factor and the expected value of the target factor may be indicated to the strategy unit 283 (such as, the strategy prescription function 296).

In some embodiments, the strategy prescription function 296 may determine one or more strategies satisfying the constraints based on the causal graph. In some embodiments, if the strategy prescription function 296 is unable to find a strategy satisfying all of the constraints, the strategy prescription function 296 may try to find one or more strategies which can satisfy at least a part of the constraints. In some embodiments, the strategy prescription function 296 may find one or more strategies which can cause a predicted value of the target factor (such as, the sales volume of the product) to approach the expected sales volume (such as, a difference between the predicted sales volume of the product and the expected sales volume is below a threshold). The strategy prescription function 296 may provide the determined one or more strategies as well as respective effects (such as, predicted values of the target factor if these strategies are carried out) to the strategy management interface 250 for presentation to the user 110. The strategy management interface 250 may allow the user 110 to select the optimal strategy according to the presented effects.

In some embodiments, the at least one user input may comprise a third request to initiate an evaluation of a strategy about a target factor from the plurality of factors. For example, the third request may indicate the target factor to the causal analysis system 200. In some embodiments, the third request may be received by the strategy management interface 250 (such as, the strategy evaluation interface 252). In some embodiments, in response to receiving the third request, the strategy management interface 250 (such as, the strategy evaluation interface 252) may determine the target factor from the third request. The strategy management interface 250 (such as, the strategy evaluation interface 252) may provide an indication of the target factor to the strategy unit 283 (such as, the strategy control/evaluation function 295).

In some embodiments, the strategy control/evaluation function 295 may determine, from the plurality of factors and based on the first causal structure, at least one factor affecting the target factor and generate a sub-structure of the first causal structure based on the target factor and the at least one factor. In some embodiments, for example, the sub-structure may be represented as sub-graph of the causal graph, which may comprise a set of nodes corresponding to the target factor and the at least one factor and one or more edges connecting the set of nodes. In some embodiments, the strategy control/evaluation function 295 may provide the sub-structure (such as, the sub-graph) of the first causal structure to the strategy management interface 250 (such as, the strategy evaluation interface 252) for presentation to the user 110, such that the user 110 can input one or more strategies for evaluation based on the presented sub-structure.

Figure 5C:
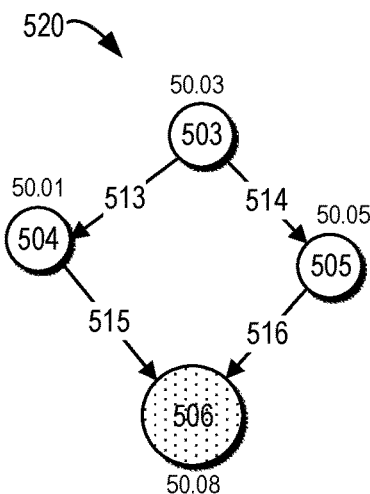

FIG. 5C illustrates an example sub-graph 520 of the causal graph 510 in accordance with some embodiments of the present disclosure. As shown in FIG. 5C, the third request received from the user 110 for initiating an evaluation of a strategy may indicate that the target factor is the factor 506. In some embodiments, the third request may also indicate some additional information about the at least one factor to be shown in the sub-graph. For example, the third request may also indicate that a distance (that is, the number of causal edges) from each of the at least one factor to the target factor should be below a threshold (for example, 2 in FIG. 5C). As shown in FIG. 5C, the determined at least one factor affecting the target factor includes three factors 503, 504 and 505. It can be seen that the distance from each of the three nodes 503, 504 and 505 to the node 506 is below 2. In particular, FIG. 5C also shows respective values of the three factors 503, 504 and 505 and the target factor 506. For example, the values of the factors 503, 504, 505 and 506 are shown as "50.03", "50.01", "50.05" and "50.08" respectively. In this way, the user 110 can edit the values of one or more of the nodes 503, 504 and 505 to input a control strategy affecting the target factor 506 for evaluation.

In some embodiments, the strategy management interface 250 (such as, the strategy evaluation interface 252) may further receive a strategy for evaluation from the user 110, which is inputted based on the presented sub-structure (such as, the sub-graph 520). As described above, for example, the strategy management interface 250 (such as, the strategy evaluation interface 252) may allow the user 110 to input one or more strategies for evaluation. For example, a strategy inputted by the user 110 may indicate values of at least one factor affecting the target factor. The inputted strategy may be provided to the strategy unit 283 (such as, the strategy control/evaluation function 295). In some embodiments, the strategy control/evaluation function 295 may execute a simulation to predict a value of the target factor based on the causal graph and the values of the at least one factor indicated by the strategy. The strategy control/evaluation function 295 may provide the predicted value of the target factor to the strategy management interface 250 for presentation to the user 110 as a result of the evaluation of the strategy. In this way, the user 110 can foresee an effect of the strategy if the strategy is carried out.

Figure 5D:
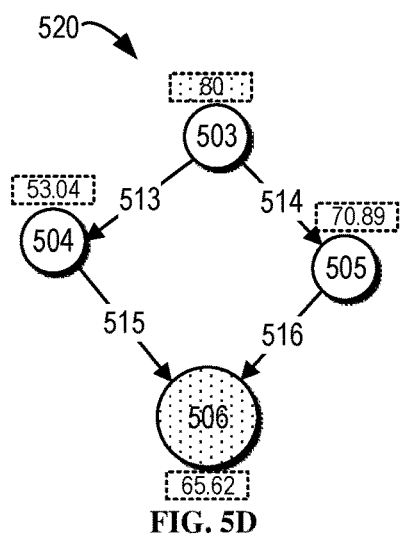
Figure 5E:
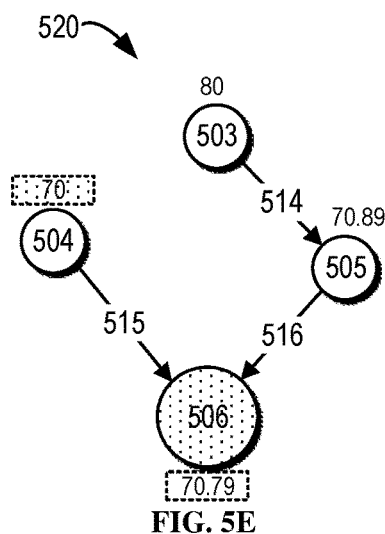

FIGS. 5D and 5E illustrate examples of evaluations of different strategies for affecting the target factor in accordance with some embodiments of the present disclosure. As shown in FIG. 5D, for example, the user 110 may change the value of the factor 503 from "50.03" as shown in FIG. 5C to "80". The strategy control/evaluation function 295 may predict, based on the causal relationship, values of the factors 504, 505 and 506 that are affected by the factor 503. For example, the predicted value of the factor 504 is "53.04", which is different from its original value "50.01" as shown in FIG. 5C. The predicted value of the factor 505 is "70.89", which is different from its original value "50.05" as shown in FIG. 5C. The predicted value of the target factor 506 is "65.62", which is different from its original value "50.08" as shown in FIG. 5C. The predicted values can be presented to the user 110 as a result of the evaluation. As shown in FIG. 5E, for example, the user 110 may further change the value of the factor 504 from "53.04" as shown in FIG. 5D to "70". The strategy control/evaluation function 295 may predict, based on the causal relationship, a value of the factor 506 that is affected by the factor 504. For example, the predicted value of the factor 506 is "70.79", which is different from "65.62" as shown in FIG. 5D. In particular, since the value of the factor 504 is controlled by the user 110, the factor 504 is no longer affected by the factor 504. Therefore, as shown in FIG. 5E, the causal edge 513, which indicates that the factor 503 is a direct cause of the factor 504, is removed from the causal graph 520.

Figure 6:
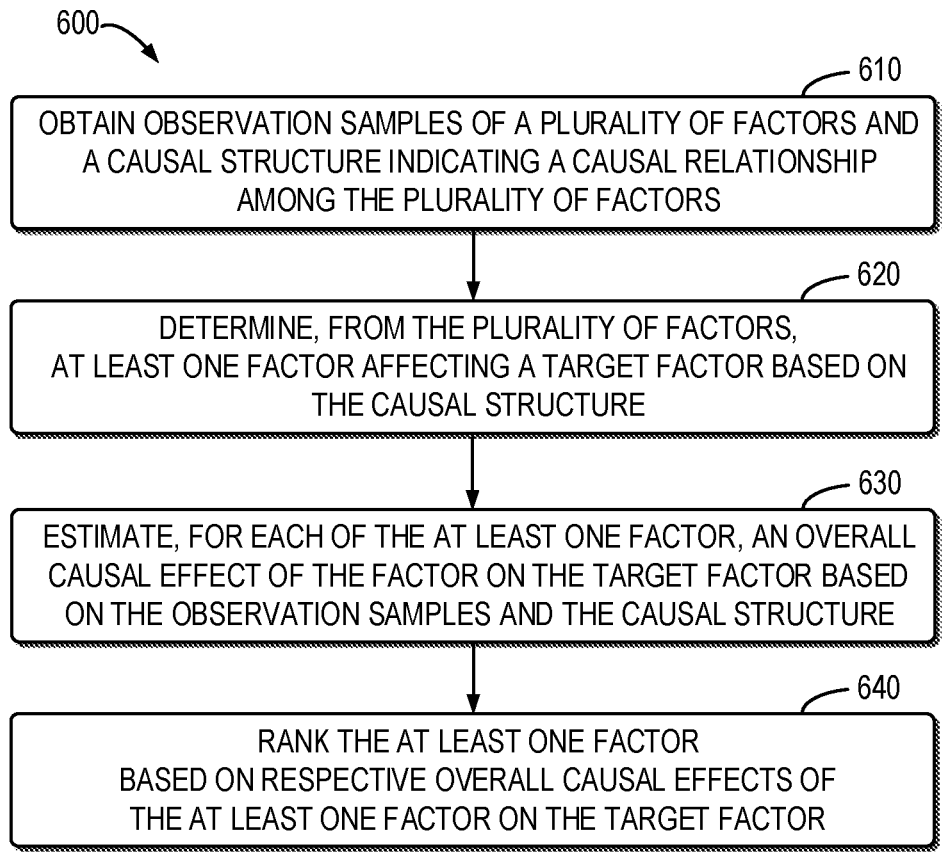
FIG. 6 illustrates an example method for causal analysis in accordance with some embodiments of the present disclosure.

FIG. 6 illustrates an example method 600 for locating key factors affecting a target factor in accordance with some embodiments of the present disclosure. The method 600 can be implemented at the causal analysis engine 122 as shown in FIGS. 1A-1B, 2A and/or 2C. In some embodiments, for example, the method 600 can be implemented by the key factor analysis function 294 of the causal analysis module 280 in the causal analysis engine 122.

At block 610, the causal analysis engine 122 may obtain observation samples of a plurality of factors and a causal structure which indicates a causal relationship among the plurality of factors. In some embodiments, the observation samples of the plurality of factors may be received via the user interface module 121 and stored at a database (such as, the database 123 as shown in FIG. 1A or the database 161 as shown in FIG. 1B). The causal structure can be discovered by the causal analysis engine 122 (such as, the causal structure discovery module 270) and stored at the database. That is, the causal analysis engine 122 may obtain the observation samples of the plurality of factors and the causal structure from the database. Alternatively, in some embodiments, the causal analysis engine 122 may obtain the observation samples of the plurality of factors from the user interface module 121 and obtain the causal structure by discovering the causal structure from the observation samples.

At block 620, in response to a target factor being identified in the plurality of factors, the causal analysis engine 122 may determine, from the plurality of factors, at least one factor affecting the target factor based on the causal structure.

At block 630, the causal analysis engine 122 may estimate, for each of the at least one factor, an overall causal effect of the factor on the target factor based on the observation samples and the causal structure. As used herein, the "overall causal effect" may refer to a sum of direct causal effects and indirect causal effects of the factor on the target factor. In some embodiments, the causal analysis engine 122 may estimate the overall causal effect of the factor on the target factor based on a causal effect estimation algorithm. It is to be understood that the causal effect estimation algorithm can be any estimation algorithm or estimator currently known or to be developed in the future.

In some embodiments, the causal analysis engine 122 may determine, from the causal structure, one or more causal paths between the factor and the target factor. The causal analysis engine 122 may further estimate, for each of the one or more causal paths, a causal effect of the factor on the target factor. The causal analysis engine 122 may then determine a sum of causal effects for the one or more causal paths as the overall causal effect of the factor on the target factor.

Figure 7:
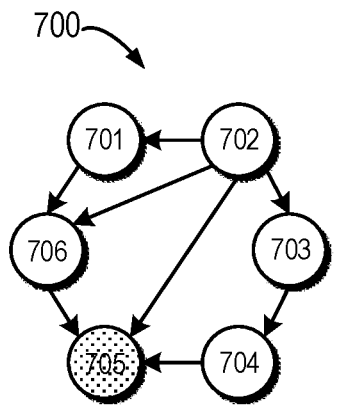
FIG. 7 illustrates an example of determining an overall causal effect of a cause factor on a target factor in accordance with some embodiments of the present disclosure.

FIG. 7 illustrates an example of determining an overall causal effect of a cause factor on a target factor in accordance with some embodiments of the present disclosure. As shown in FIG. 7, a causal structure 700 may include factors 701, 702 . . . 706. The factor 705 is identified as the target factor. It is assumed that an overall causal effect of the factor 702 on the target factor 705 is to be determined. The causal analysis engine 122 may first identify causal paths between the factor 702 and the target factor 705. For example, the causal paths between the factor 702 and the target factor 705 include: (1) factor 702→factor 705; (2) factor 702→factor 706→factor 705; (3) factor 702→factor 701→factor 706→factor 705; and (4) factor 702→factor 703→factor 704→factor 705. The causal analysis engine 122 may estimate, for the above four causal paths, respective causal effects of the factor 702 on the target factor 705. Then, the causal analysis engine 122 may sum up the estimated causal effects to derive the overall causal effect of the factor 702 on the target factor 705.

With reference back to FIG. 6, at block 640, the causal analysis engine 122 may rank the at least one factor based on the estimated overall causal effects of the at least one factor on the target factor, so as to obtain a sequence of key factors which affect the target factor.

In some embodiments, the overall causal effect of a cause factor on the target factor may be estimated as a positive value or a negative value. For example, a positive value may indicate that the observation value of the target factor may increase as the value of the cause factor increases, while a negative value may indicate that the observation value of the target factor may decrease as the value of the cause factor increases.

In some embodiments, the causal analysis engine 122 may determine respective absolute values of the overall causal effects of the at least one factor on the target factor, and then rank the at least one factor based on the determined absolute values.

Figure 8:
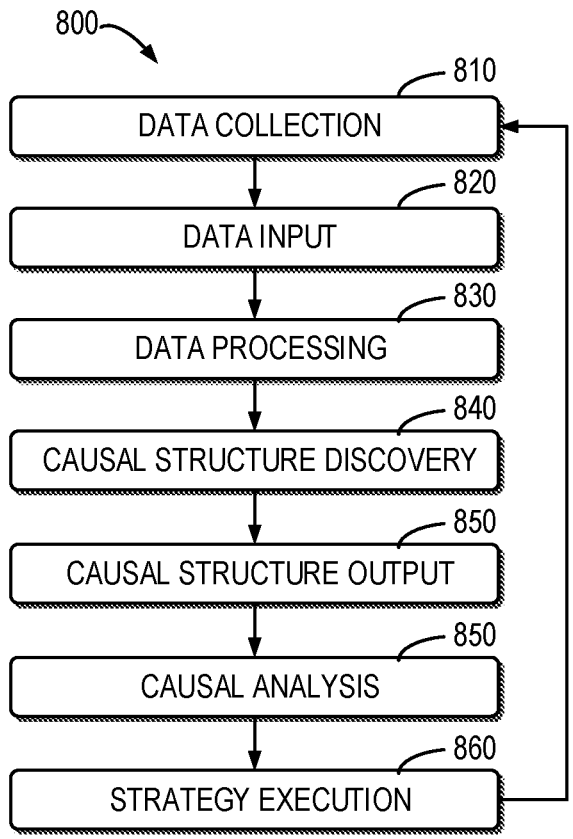
FIG. 8 illustrates a general process for causal analysis in accordance with some embodiments of the present disclosure.

A general process 800 for causal analysis in accordance with some embodiments of the present disclosure can be summarized in FIG. 8. As shown in FIG. 8, the general process 800 may include one or more actions 810 for data collection (such as, collection of observation samples), one or more actions 820 for data input (such as, uploading the observation samples), one or more actions 830 for data processing (such as, data pre-processing, factor engineering and/or factor shrinkage), one or more actions 840 for causal relationship/structure discovery, one or more actions 850 for outputting the discovered causal relationship/structure, one or more actions 860 for causal analysis and one or more actions 870 for executing a strategy. The process 800 can be executed more than once. It is to be understood that the process 800 may include additional actions not shown and/or may omit some shown actions. It is to be also understood that the process 800 can be implemented by a single physical device or by a plurality of physical devices. The scope of the present disclosure is not limited in this regard.

In view of the above, it can be seen that, embodiments of the present disclosure enable automatic discovery of a causal relationship among a plurality of factors. A causal structure representing the causal relationship can be presented to a user. The user can adjust the causal structure to input some prior knowledge, so as to optimize the discovered causal relationship. Key factors affecting the target factor can be located in the plurality of factors. Moreover, embodiments of the present disclosure can evaluate an effect of a strategy which is inputted by the user for affecting the target factor. Embodiments of the present disclosure can also recommend one or more optimal strategies to the user.

Figure 9:
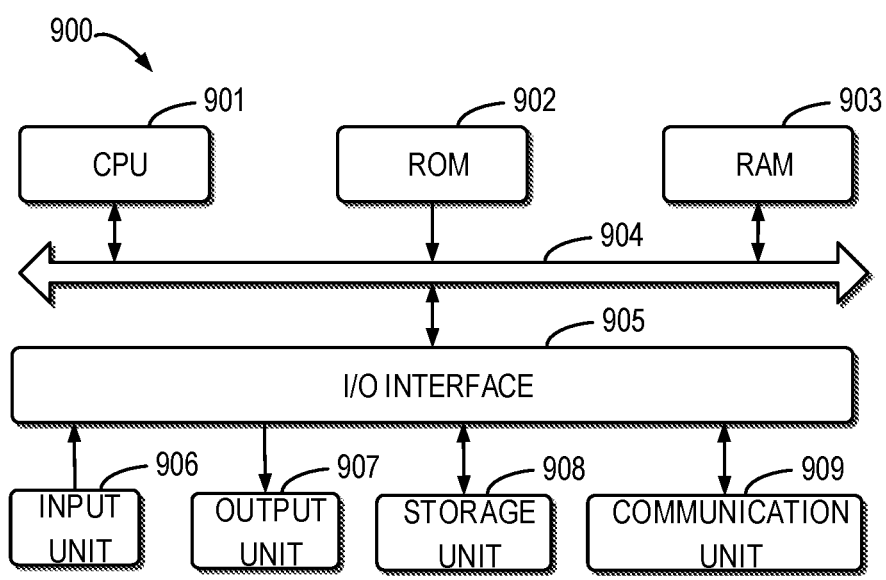
FIG. 9 is a simplified block diagram of a device that is suitable for implementing embodiments of the present disclosure.

FIG. 9 illustrates a schematic block diagram of a device 900 that can be used to implement the embodiments of the present disclosure. For example, the causal analysis server 120 as shown in FIG. 1A, the user device 140 or the causal analysis server 160 as shown in FIG. 1B, and/or the causal analysis engine 122 as shown in FIGS. 1A-1B, 2A and/or 2C can be implemented by the device 900. As shown in FIG. 9, the device 900 includes a central processing unit (CPU) 901 which may perform various appropriate actions and processing based on computer program instructions stored in the read only memory (ROM) 902 or computer program instructions uploaded from storage unit 908 to the random access memory (RAM) 903. In the RAM 903, there further stores various programs and data needed by operation of the device 900. The CPU 901, ROM 902 and RAM 903 are connected one another via a bus 904. The input/output (I/O) interface 905 is also connected to the bus 904.

The following components in the device 900 are connected to the I/O interface 905: including: an input unit 906, such as a keyboard, a mouse, and the like; an output unit 907, such as display of various types and loudspeakers; a storage unit 908, such as magnetic disk and optical disk; a communication unit 909, such as network card, modem, wireless communication transceiver. The communication unit 909 allows the device 900 to exchange data/information with other devices via computer networks, such as Internet and/or telecommunication networks.

The methods or processes described above, such as the methods 400, 600 and/or the process 800, can be executed by the processing unit 901. For example, in some implementations, the methods 400, 600 and/or the process 800 can be implemented as a computer software program which is corporeally contained in a machine readable medium, such as the storage unit 908. In some implementations, the computer program can be partially or wholly loaded and/or mounted on the device 900 by the ROM 902 and/or the communication unit 909. When the computer program is uploaded to the RAM 903 and executed by the CPU 901, one or more steps of the method 200 described above can be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, from observation samples of a plurality of factors, a first causal structure indicating a first causal relationship among the plurality of factors, each observation sample including a set of observation values of the plurality of factors;
    presenting the first causal structure to a user;
    in response to receiving at least one user input about the first causal structure from the user, executing actions associated with the at least one user input based on the first causal structure; and
    presenting a result of the execution of the actions to the user,
    wherein the at least one user input comprises an edit operation performed on the first causal structure,
    wherein the first causal structure is presented as a causal graph comprising a plurality of nodes corresponding to the plurality of factors and at least one edge connecting the plurality of nodes, the at least one edge indicates the first causal relationship among the plurality of factors, and
    wherein the edit operation comprises adding one or more labels to the causal graph, so as to indicate prior knowledge about causality among the plurality of nodes.

2. The method of claim 1, wherein executing the actions comprises:
    determining, from the edit operation, information for optimizing the first causal structure; and
    determining, based on the information and the observation samples of the plurality of factors, a second causal structure indicating a second causal relationship among the plurality of factors, the second causal structure being different from the first causal structure.

3. The method of claim 2, wherein presenting the result to the user comprises:
    presenting the second causal structure to the user, the second causal structure reflecting the edit operation performed on the first causal structure.

4. The method of claim 2,
wherein the edit operation further comprises one of the following:
adding, to the causal graph, an edge for connecting two of the plurality of nodes, so as to indicate direct causality between the two nodes;
removing, from the causal graph, an edge connecting two of the plurality of nodes, so as to indicate no direct causality between the two nodes; and
redirecting an edge connecting two of the plurality of nodes, so as to redirect causality between the two nodes.

5. The method of claim 1, wherein the at least one user input comprises a first request to retrieve a first number of key factors affecting a target factor from the plurality of factors, and wherein executing the actions comprises:
in response to receiving the first request, determining, from the first request, the target factor and the first number of key factors;
determining, from the plurality of factors, at least one factor affecting the target factor based on the first causal structure;
estimating respective causal effects of the at least one factor on the target factor based on the observation samples and the first causal structure;
ranking the at least one factor based on the estimated causal effects; and
selecting, from the at least one factor, the first number of key factors based on a result of the ranking.

6. The method of claim 5, wherein presenting the result to the user comprises:
presenting the first number of key factors to the user.

7. The method of claim 6, wherein presenting the result to the user further comprises:
presenting causal effects of the first number of key factors on the target factor to the user.

8. The method of claim 1, wherein the at least one user input comprises a second request to obtain a strategy that enables a target factor from the plurality of factors to reach an expected value, and wherein executing the actions comprises:
in response to receiving the second request, determining, from the second request, the target factor and the expected value of the target factor; and
generating, based on the first causal structure and the expected value of the target factor, a strategy for configuring at least one factor from the plurality of factors,
wherein the strategy indicates values of the at least one factor such that a difference between a value of the target factor predicted based on the values of the at least one factor and the expected value of the target factor is below a threshold.

9. The method of claim 8, wherein presenting the result to the user comprises:
presenting the strategy and/or the predicted value of the target factor to the user.

10. The method of claim 1, wherein the at least one user input comprises a third request to initiate an evaluation of a strategy for affecting a target factor from the plurality of factors, and wherein executing the actions comprises:
in response to receiving the third request, determining the target factor from the third request;
determining, from the plurality of factors, at least one factor affecting the target factor based on the first causal structure;
generating a sub-structure of the first causal structure based on the target factor and the at least one factor.

11. The method of claim 10, wherein presenting the result to the user comprises:
presenting the sub-structure of the first causal structure to the user, so as to enable the user to input a strategy about the target factor based on the sub-structure for evaluation.

12. The method of claim 11, wherein the at least one user input further comprises a strategy inputted by the user based on the sub-structure for evaluation, the strategy indicates values of the at least one factor, and wherein executing the actions further comprises:
predicting, based on the first causal structure and the values of the at least one factor, a value of the target factor.

13. The method of claim 12, wherein presenting the result to the user further comprises:
presenting the predicted value of the target factor to the user as a result of the evaluation of the strategy.

14. A computer-implemented method comprising:
obtaining observation samples of a plurality of factors and a causal structure indicating a causal relationship among the plurality of factors, each observation sample including a set of observation values of the plurality of factors;
in response to a target factor being identified in the plurality of factors, determining, from the plurality of factors, at least one factor affecting the target factor based on the causal structure;
estimating, for each of the at least one factor, an overall causal effect of the factor on the target factor based on the observation samples and the causal structure; and
ranking the at least one factor based on respective overall causal effects of the at least one factor on the target factor,
wherein the at least one user input comprises an edit operation performed on the first causal structure,
wherein the first causal structure is presented as a causal graph comprising a plurality of nodes corresponding to the plurality of factors and at least one edge connecting the plurality of nodes, the at least one edge indicates the first causal relationship among the plurality of factors, and
wherein the edit operation comprises adding one or more labels to the causal graph, so as to indicate prior knowledge about causality among the plurality of nodes.

15. The method of claim 14, wherein obtaining the causal structure comprises:
determining the causal structure from the observation samples.

16. The method of claim 14, wherein estimating the overall causal effect of the factor on the target factor comprises:
estimating the overall causal effect of the factor on the target factor based on a causal effect estimation algorithm.

17. The method of claim 14, wherein estimating the overall causal effect of the factor on the target factor comprises:
  determining, from the causal structure, one or more causal paths between the factor and the target factor;
  estimating, for each of the one or more causal paths, a causal effect of the factor on the target factor; and
  determining a sum of causal effects for the one or more causal paths as the overall causal effect of the factor on the target factor.

18. The method of claim 14, wherein the overall causal effect of the factor on the target factor is estimated as a positive value or a negative value, and wherein ranking the at least one factor comprises:
  determining respective absolute values of the overall causal effects of the at least one factor on the target factor; and
  ranking the at least one factor based on the determined absolute values.

19. An electronic device comprising:
  a processor configured to
  determine, from observation samples of a plurality of factors, a first causal structure indicating a first causal relationship among the plurality of factors, each observation sample including a set of observation values of the plurality of factors;
  output the first causal structure to a user;
  in response to receiving at least one user input about the first causal structure from the user, execute actions associated with the at least one user input based on the first causal structure; and
  present a result of the execution of the actions to the user,
  wherein the at least one user input comprises an edit operation performed on the first causal structure,
  wherein the first causal structure is presented as a causal graph comprising a plurality of nodes corresponding to the plurality of factors and at least one edge connecting the plurality of nodes, the at least one edge indicates the first causal relationship among the plurality of factors, and
  wherein the edit operation comprises adding one or more labels to the causal graph, so as to indicate prior knowledge about causality among the plurality of nodes.

20. The electronic device of claim 19, wherein the processor is further configured to
  determine, from the edit operation, information for optimizing the first causal structure; and
  determine, based on the information and the observation samples of the plurality of factors, a second causal structure indicating a second causal relationship among the plurality of factors, the second causal structure being different from the first causal structure.

* * * * *